(12) United States Patent
Tocalini et al.

(10) Patent No.: US 12,192,541 B2
(45) Date of Patent: Jan. 7, 2025

(54) ADAPTIVE AUDIO BITRATE SELECTION

(71) Applicant: ROKU, INC., San Jose, CA (US)

(72) Inventors: Rodrigo Emiliano Tocalini, Sunnyvale, CA (US); Andrey Marsavin, San Jose, CA (US); Govind Vaidya, San Ramon, CA (US); Robert Fitzgerald Watts, Gilroy, CA (US); Wim Michiels, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/126,838

(22) Filed: Mar. 27, 2023

(65) Prior Publication Data

US 2024/0333985 A1    Oct. 3, 2024

(51) Int. Cl.
*H04N 21/233*    (2011.01)
*H04N 21/2662*    (2011.01)

(52) U.S. Cl.
CPC ..... *H04N 21/2335* (2013.01); *H04N 21/2662* (2013.01)

(58) Field of Classification Search
None
See application file for complete search history.

(56) References Cited

U.S. PATENT DOCUMENTS

| | | | | |
|---|---|---|---|---|
| 6,125,398 A * | 9/2000 | Mirashrafi | ......... | H04L 12/1822 370/263 |
| 7,409,145 B2 * | 8/2008 | Antoun | ................ | G11B 27/034 |
| 2004/0105505 A1 * | 6/2004 | Kitamura | ......... | H04N 21/44004 375/259 |
| 2004/0240390 A1 * | 12/2004 | Seckin | ............... | H04N 21/6377 370/252 |
| 2010/0161825 A1 * | 6/2010 | Ronca | .............. | H04N 21/23611 380/212 |
| 2012/0278833 A1 * | 11/2012 | Tam | ................. | H04N 21/47202 725/31 |
| 2012/0311094 A1 * | 12/2012 | Biderman | .......... | H04N 21/8456 709/219 |
| 2013/0308638 A1 * | 11/2013 | Grossman | ........ | H04N 21/64322 370/390 |
| 2018/0176481 A1 * | 6/2018 | Lokhande | ............ | H04N 5/9305 |

(Continued)

*Primary Examiner* — An Son P Huynh
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for performing adaptive audio bitrate selection. An example embodiment operates by receiving a data streaming request. The embodiment then streams data at a first audio bitrate. The embodiment then determines whether there is a streaming discontinuity associated with the data. The embodiment then determines, in response to the determination that there is a streaming discontinuity, whether a network condition satisfies one or more conditions based on one or more streaming parameters. The embodiment then, in response to the determination that the network condition satisfies the one or more conditions, adjusts the first audio bitrate to a second audio bitrate during the streaming discontinuity. The embodiment then continues to stream the data, subsequent to the streaming discontinuity, at the second audio bitrate to complete the data streaming request.

17 Claims, 5 Drawing Sheets

(56) References Cited

U.S. PATENT DOCUMENTS

| | | | |
|---|---|---|---|
| 2019/0191203 A1* | 6/2019 | Asbun | H04N 21/4316 |
| 2020/0152234 A1* | 5/2020 | Sharma | H04N 21/23439 |
| 2021/0084354 A1* | 3/2021 | May, Jr. | H04N 21/25858 |
| 2021/0289238 A1* | 9/2021 | Hamada | H04N 21/233 |

* cited by examiner

ADAPTIVE AUDIO BITRATE SELECTION

FIELD

This disclosure is generally directed to data streaming technology, and more particularly to adaptive audio bitrate selection for data streaming.

BACKGROUND

Streaming may be performed at varying levels of qualities and associated bitrates or speed. Streaming at a high level of quality may require enough network bandwidth to download the amount of data needed. Network bandwidth may be a limited resource and may be an impediment to providing an adequate streaming experience. For example, one or more streaming discontinuities may occur when streaming at a high bitrate with a limited network bandwidth. These streaming discontinuities may include interruptions to buffer one or more streams (e.g., rebuffer). A balance may be needed between serving the highest quality audio and video content possible while minimizing the amount of streaming discontinuities.

SUMMARY

Provided herein are system, apparatus, article of manufacture, method and/or computer program product embodiments, and/or combinations and sub-combinations thereof, for adaptive audio bitrate selection for data streaming. The technology as described herein, in some embodiments, may be configured to improve or prevent a streaming discontinuity. In some embodiments, the technology may be applied broadly to any configurable aspect of streaming video and/or audio.

An example embodiment operates by a computer-implemented method for performing adaptive audio bitrate selection. The method includes receiving, by a media device, a data streaming request. The method further includes streaming data at a first audio bitrate in response to the data streaming request. The method further includes determining whether there is a streaming discontinuity associated with the data. The method further includes determining, in response to the determination that there is a streaming discontinuity, whether a network condition satisfies one or more conditions based on one or more streaming parameters. The method further includes, in response to the determination that the network condition satisfies the one or more conditions, adjusting the first audio bitrate to a second audio bitrate during the streaming discontinuity. The second audio bitrate is different from the first audio bitrate. The method further includes continuing to stream the data, subsequent to the streaming discontinuity, at the second audio bitrate to complete the data streaming request.

In some embodiments, the streaming discontinuity can include an event of a rebuffer, an event of a streaming session paused by a user, or an event of an interruption on the data.

In some embodiments, the network condition can be associated with previously downloaded information.

In some embodiments, the adjusting the first audio bitrate to a second audio bitrate during the streaming discontinuity can include selecting an audio stream at the second bitrate.

In some embodiments, the one or more streaming parameters can include a network bandwidth, a measured network bandwidth available for video downloads, a selected bitrate for video or audio, available bitrates for video or audio, an audio or video bandwidth, or an audio or video buffer level.

In some embodiments, the one or more conditions can include a measured network bandwidth available for video downloads that is lower or equal to a lowest available bitrate for a video chunk; a most recently selected video chunk bitrate is equal to a lowest available bitrate for a video chunk; an addition of the measured network bandwidth available for video downloads and a difference between a highest available bitrate for audio and a lowest available bitrate for audio is greater than or equal to the most recently selected video chunk bitrate; a current audio bandwidth is greater than a current video bandwidth; a network bandwidth is below a threshold; or an audio buffer level or a video buffer level is below a threshold.

In some embodiments, subsequent to continuing to stream the data at the second audio bitrate, the method can include determining whether there is a subsequent streaming discontinuity associated with the data; determining, in response to the determination that there is a subsequent streaming discontinuity, whether the network condition satisfies the one or more conditions based on the one or more streaming parameters; in response to the determination that the network condition does not satisfy the one or more conditions, adjusting the second audio bitrate to the first audio bitrate during the subsequent streaming discontinuity, continuing to stream the data, subsequent to the subsequent streaming discontinuity, at the first audio bitrate to complete the data streaming request.

An example embodiment operates by a system that includes at least one processor configured to perform operations including receiving a data streaming request. The operations can further include streaming data at a first audio bitrate in response to the data streaming request. The operations can further include determining whether there is a streaming discontinuity associated with the data. The operations can further include determining, in response to the determination that there is a streaming discontinuity, whether a network condition satisfies one or more conditions based on one or more streaming parameters. The operations can further include in response to the determination that the network condition satisfies the one or more conditions, adjusting the first audio bitrate to a second audio bitrate during the streaming discontinuity, with the second audio bitrate is different from the first audio bitrate. The operations can further include continuing to stream the data, subsequent to the streaming discontinuity, at the second audio bitrate to complete the data streaming request.

In some embodiments, the streaming discontinuity can include an event of a rebuffer, an event of a streaming session paused by a user, or an event of an interruption on the data.

In some embodiments, the network condition can be associated with previously downloaded information.

In some embodiments, the operation of adjusting the first audio bitrate to a second audio bitrate during the streaming discontinuity can include selecting an audio stream at the second bitrate.

In some embodiments, the one or more streaming parameters can include a network bandwidth, a measured network bandwidth available for video downloads, a selected bitrate for video or audio, available bitrates for video or audio, an audio or video bandwidth, or an audio or video buffer level.

In some embodiments, the one or more conditions can include a measured network bandwidth available for video downloads that is lower or equal to a lowest available bitrate for a video chunk; a most recently selected video chunk bitrate is equal to a lowest available bitrate for a video chunk; an addition of the measured network bandwidth available for video downloads and a difference between a highest available bitrate for audio and a lowest available bitrate for audio is greater than or equal to the most recently selected video chunk bitrate; a current audio bandwidth is greater than a current video bandwidth; a network bandwidth is below a threshold; or an audio buffer level or a video buffer level is below a threshold.

In some embodiments, subsequent to continuing to stream the data at the second audio bitrate, the operations can include determining whether there is subsequent streaming discontinuity associated with the data; determining, in response to the determination that there is subsequent streaming discontinuity, whether the network condition satisfies the one or more conditions based on the one or more streaming parameters; in response to the determination that the network condition does not satisfy the one or more conditions, adjusting the second audio bitrate to the first audio bitrate during the subsequent streaming discontinuity, continuing to stream the data, subsequent to the subsequent streaming discontinuity, at the first audio bitrate to complete the data streaming request.

An example embodiment operates by a non-transitory computer-readable medium having instructions stored thereon that, when executed by at least one computing device, cause the at least one computing device perform operations that include receiving a data streaming request. The operations can further include streaming data at a first audio bitrate in response to the data streaming request. The operations can further include determining whether there is a streaming discontinuity associated with the data. The operations can further include determining, in response to the determination that there is a streaming discontinuity, whether a network condition satisfies one or more conditions based on one or more streaming parameters. The operations can further include in response to the determination that the network condition satisfies the one or more conditions, adjusting the first audio bitrate to a second audio bitrate during the streaming discontinuity, with the second audio bitrate is different from the first audio bitrate. The operations can further include continuing to stream the data, subsequent to the streaming discontinuity, at the second audio bitrate to complete the data streaming request.

In some embodiments, the streaming discontinuity can include an event of a rebuffer, an event of a streaming session paused by a user, or an event of an interruption on the data.

In some embodiments, the network condition can be associated with previously downloaded information.

In some embodiments, the operation of adjusting the first audio bitrate to a second audio bitrate during the streaming discontinuity can include selecting an audio stream at the second bitrate.

In some embodiments, the one or more streaming parameters can include a network bandwidth, a measured network bandwidth available for video downloads, a selected bitrate for video or audio, available bitrates for video or audio, an audio or video bandwidth, or an audio or video buffer level.

In some embodiments, the one or more conditions can include a measured network bandwidth available for video downloads that is lower or equal to a lowest available bitrate for a video chunk; a most recently selected video chunk bitrate is equal to a lowest available bitrate for a video chunk; an addition of the measured network bandwidth available for video downloads and a difference between a highest available bitrate for audio and a lowest available bitrate for audio is greater than or equal to the most recently selected video chunk bitrate; a current audio bandwidth is greater than a current video bandwidth; a network bandwidth is below a threshold; or an audio buffer level or a video buffer level is below a threshold.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
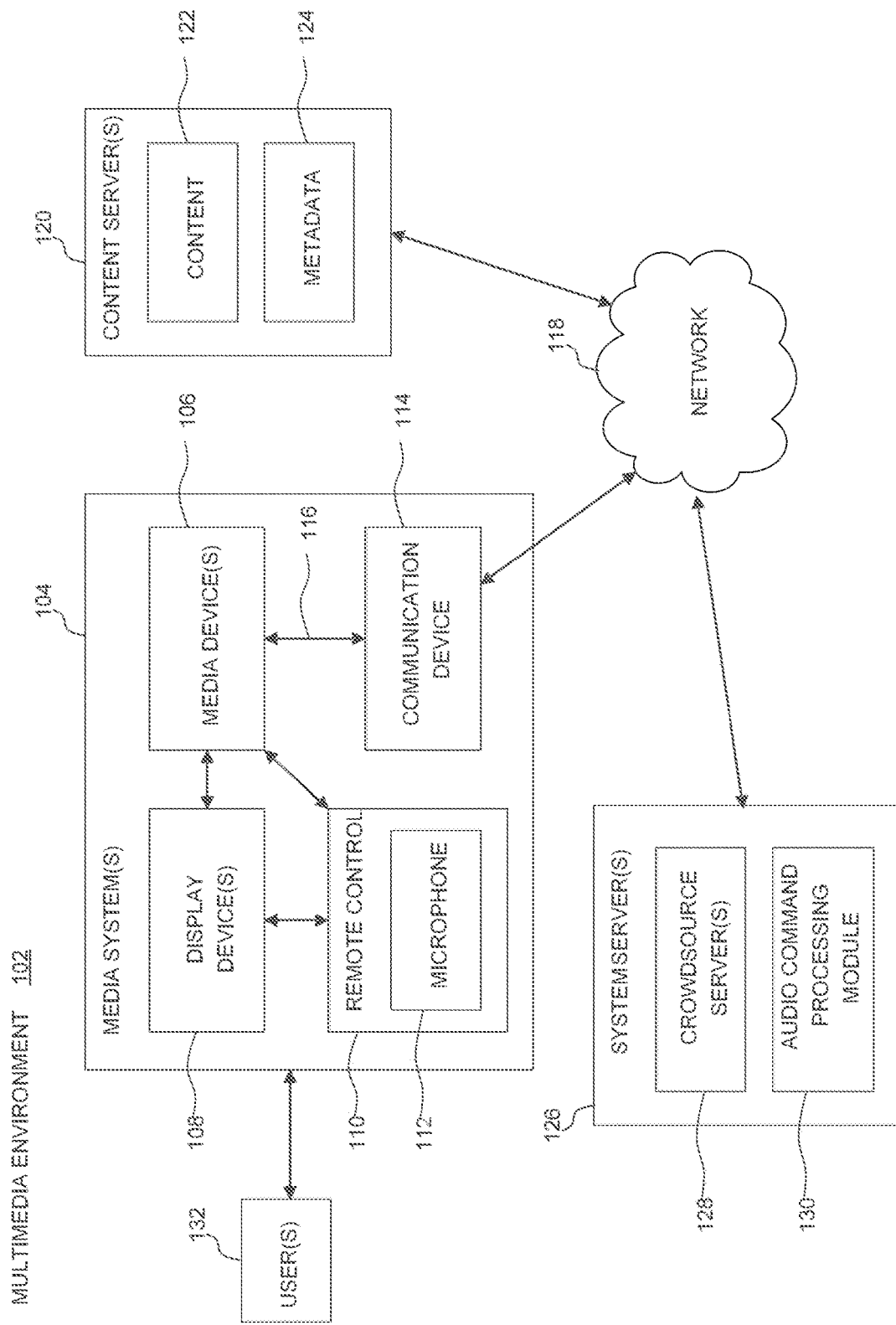
FIG. 1 illustrates a block diagram of a multimedia environment, according to some embodiments.

Provided herein are system, apparatus, article of manufacture, method and/or computer program product embodiments, and/or combinations and sub-combinations thereof, for adaptive audio bitrate selection for data streaming.

In some aspects, the technology described herein may implement an adaptive audio bitrate selection for data streaming to improve a streaming experience. For example, in cases of a network condition with a low network performance and/or network throughput, the streaming experience may be improved by selecting a lower audio bitrate, and switching to select a lower quality audio stream mid-stream. Network bandwidth may be released by selecting a lower quality audio stream to prevent future streaming discontinuities and improve streaming quality. When a streaming discontinuity is determined, the audio bitrate or quality may be reduced based on a determination that a network condition with a low network performance and/or network throughput is detected.

In some aspects, the technology described herein may implement the adaptive audio bitrate selection for data streaming. For example, a media device may receive a data streaming request. The media device may streaming data at a first audio bitrate in response to the data streaming request. The media device may determine whether there is a streaming discontinuity associated with the data. The streaming discontinuity may include an event of a rebuffer, an event of a streaming session paused by a user, or an event of an interruption on the data stream (e.g., advertisement break).

In some aspects, a rebuffer (i.e., empty buffer) may occur based on a difference between the bitrate for streaming and current playback rate (consumption speed). An empty buffer may result in degraded streaming experience by pausing streaming and entering a buffering phase to accumulate enough data such that streaming can continue.

In some aspects, the media device may determine, in response to the determination that there is a streaming discontinuity, whether a network condition satisfies one or more conditions based on one or more streaming parameters. The network condition may be associated with previously downloaded information. The one or more conditions may indicate one or more network conditions or issues that may produce one or more future streaming discontinuities, such as a rebuffer, and/or degraded streaming experience.

In response to the determination that the network condition satisfies the one or more conditions, the media device may adjust the first audio bitrate to a second audio bitrate during the streaming discontinuity. The second audio bitrate may be different, such as lower than the first audio bitrate.

In some aspects, the media device may continue to stream the data, subsequent to the streaming discontinuity, at the second audio bitrate to complete the data streaming request.

By adjusting the audio bitrate, computation time may be saved for a network condition with a low network performance and/or network throughput. In addition, if the second audio bitrate is associated with a different codec, audio issues, such as audio blips, may be avoided, due to non-seamless codec switching.

Throughout the descriptions, the terms speed, bitrate and bandwidth may be used interchangeably.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowd-source server(s) 128 may operate to cause closed captioning to be automatically turned on and/or off during future streaming's of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
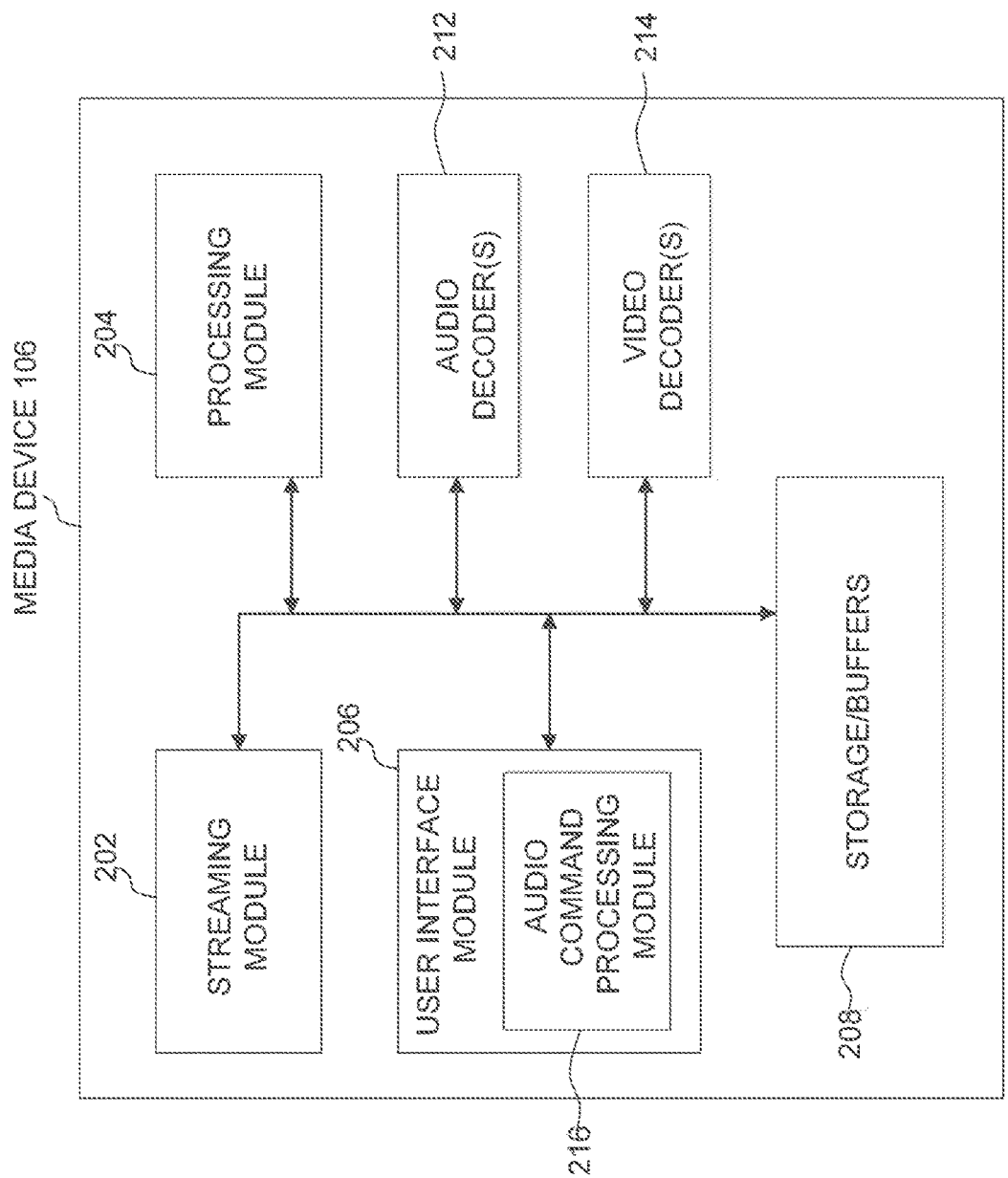
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Adaptive Audio Bitrate Selection

The technology as described herein, in some embodiments, may be configured to perform an adaptive audio bitrate selection for streaming video and/or audio, during a streaming discontinuity and based on a network condition. In these embodiments, the technology may be applied broadly to any configurable aspect of an adaptive audio bitrate selection process.

In some aspects, media content may be streamed over one or more networks so that a device does not have to download an entire video file before playing it. In some aspects, media content may be streamed over computer networks by using an adaptive streaming technology, such as for example, Dynamic Adaptive Streaming over HTTP (DASH) technology, where media content is partitioned into one or more segments and delivered to a client using HTTP. More specifically, source content may be encoded at multiple bitrates. Each of the different bitrate streams are segmented into small multi-second parts (chunks). The segment size may vary depending on the particular implementation, but they are commonly between two and ten seconds. In one non-limiting example, during stream start-up, the client may request the segments from a lowest bitrate stream. If the client finds that the network throughput is greater than the bitrate of the downloaded segment, then it may request a higher bitrate segment. Later, if the client finds that the network throughput has deteriorated, it may request a lower bitrate segment.

In some aspects, data segments may be pre-loaded for streaming video content. The data segments may be pre-loaded into a reserved section of memory, for example, a buffer. A streaming device may buffer a media content, such as a video, because the video may normally be downloaded faster than the speed at which the video plays.

In some aspects, a streaming discontinuity may include, for example, a rebuffer (e.g., empty buffer) or a buffer underrun. The rebuffer may occur when the video plays faster than it can be downloaded. For example, the reserved section of the memory (e.g., the buffer) may fail to provide the video and/or audio needed for playback, such that the video and/or audio needed for playback cannot be retrieved fast enough from the buffer. For example, a loading symbol, such as a spinning wheel, may be displayed during the rebuffer, indicating that the buffer is loading. In some aspects, rebuffer (e.g., empty buffer) may occur based on a difference between the bitrate for streaming and current playback rate (consumption speed). An empty buffer may result in degraded streaming experience by pausing streaming and entering a buffering phase to accumulate enough data such that streaming can continue.

In some aspects, a streaming discontinuity may include, for example, an event of a streaming session paused by a user, or an event of an interruption on the data stream such as an advertisement break.

In some aspects, the network condition may include a network condition with a low network performance and/or network throughput. The network condition may include network performance that is not enough to sustain video streaming at a selected quality. The network condition may be associated with previously downloaded information. For example, the previously downloaded information may include a download speed of a content. A slow download speed may indicate or be associated with the network condition with a low network performance and/or network throughput. The network condition may be determined based on various streaming parameters, such as, but not limited to, a network bandwidth, a measured network bandwidth available for video downloads, a selected bitrate for video or audio, available bitrates for video or audio, an audio or video bandwidth, or an audio or video buffer level.

In some aspects, a media device (e.g., media device 106) may perform an adaptive audio bitrate selection to dynamically adjust an audio bitrate during a streaming discontinuity and based on a network condition. For example, the media device may switch from selecting an audio stream at a high bitrate or audio quality to an audio stream at a low bitrate or audio quality, such as for example, the lowest decode-able audio quality.

Referring to FIG. 2, streaming module 202 may be configured with adaptive audio bitrate selection or processing elements. In one non-limiting example, streaming module 202 may be configured with a processor, a System On a Chip (SOC), video card, gaming processor, etc., as is known. While a processor is described herein as part of streaming module 202, one or more processing steps may be performed external to the streaming module 202. In one non-limiting example, processing may be performed by television circuitry, media device 106, ancillary computing devices of user 132 or a combination of any of these processing elements.

Figure 3:
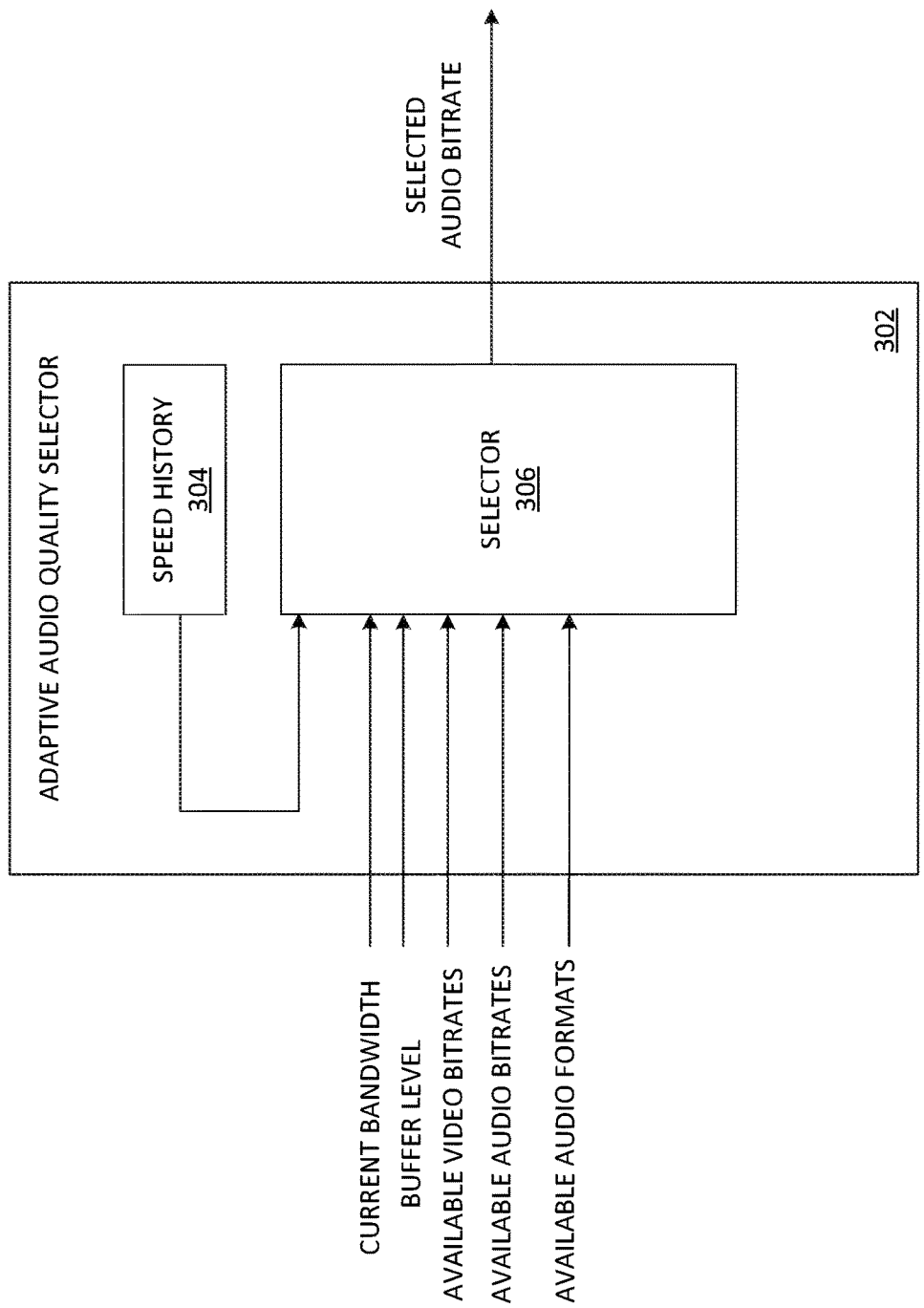
FIG. 3 illustrates a block diagram of an audio bitrate selection system, according to some embodiments.

FIG. 3 illustrates a block diagram of an audio bitrate selection system 300, according to some embodiments. Audio bitrate selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps described may be performed simultaneously, or in a different order than described for FIG. 3, as will be understood by a person of ordinary skill in the art.

As shown in FIG. 3, an adaptive quality selector 302 may be configured with two major modules: speed history module 304 and selector module 306. Each of these modules may be implemented by processing logic that can comprise hardware (e.g., circuitry, dedicated logic, programmable logic, microcode, etc.), software (e.g., instructions executing on a processing device), or a combination thereof.

In some aspects, the speed history module 304 may retain a history of previous download speeds (bitrates). In some examples, a network bandwidth, a measured network bandwidth available for video downloads, previous bitrates for video chuck or audio may be derived from the previous download speeds. In some examples, the network bandwidth may include a data transfer rate or capacity of a network associated the adaptive quality selector 302. In some examples, the measured network bandwidth available for video downloads may not include an audio bandwidth that audio occupies. The measured network bandwidth available for video downloads may increase when the audio bandwidth is decreased. In some examples, the previous video chunk bitrates may include the most recently selected video chunk bitrate, such as a video bitrate selected using an adaptive streaming technology. Bandwidth may refer to the rate of data transfer, bitrate or data throughput.

In some aspects, the selector module 306 may receive one or more outputs from the speed history module 304, such as a measured network bandwidth available for video downloads, the most recently selected video chunk bitrate, as one or more inputs. Alternatively or in addition, the selector module 306 may receive one or more streaming parameters as inputs. The one or more streaming parameters may include a current bandwidth, a buffer level, one or more available video bitrates, one or more available audio bitrates, or one or more available audio formats. In some examples, the current bandwidth may include a current audio bandwidth, a current video bandwidth, and/or a current network bandwidth. The buffer level may include an audio buffer level and/or a video buffer level. In some aspects, the selector module 306 may determine an event of a streaming discontinuity, such as a rebuffer (e.g., empty buffer) based on the buffer level.

In some aspects, the one or more available video or audio bitrates may be associated with one or more encoding functions. In some aspects, an encoder (not shown) may encode a single source media (video or audio) at multiple bitrates. Alternatively or in addition, audio content may be encoded by using different codecs, and/or associated with different audio formats. The encoding function may be performed at a content provider or server-side content distribution system. These multiple bitrates may represent different speeds/quality available bitrates for selection by the selector module 306. The selector module 306 may switch between streaming the different encodings depending on available resources. In some aspects, the single source media may be pre-encoded at differing rates, using different codecs or alternately, or in addition to, may be encoded on-the-fly. In some aspects, the one or more available audio formats may include different formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples, associated with the single source media encoded by different codecs. The selector module 306 may receive the one or more available video or audio bitrates, and/or the one or more available audio formats from one or more manifest files describing many variants of single media. In some examples, the manifest files may include information describing how the single media is split into individual chunks of data, and/or different bitrates, several audio tracks, and/or the same media encoded in different formats. In some examples, the one or more streaming parameters may not be limited to a current bandwidth, a buffer level, one or more available video bitrates, one or more available audio bitrates, or one or more available audio formats, and may be other parameters used associated with steaming.

In some aspects, the selector module 306 may generate, based on an adaptive audio bitrate selection process (e.g., FIG. 4), decisions to select what audio bitrate to choose for the next downloading segment (chunk). In some examples, the selector module 306 may determine whether there is a streaming discontinuity. In some examples, the selector module 306 may determine whether a network condition satisfies one or more conditions based on the one or more inputs. In some examples, the selector module 306 may select a low audio bitrate, such as the lowest decode-able audio bitrate or quality from the one or more available audio bitrates. The selector module 306 may switch from selecting the highest audio bitrate or quality (default behavior) to selecting the lowest decode-able audio quality. In some examples, the selector module 306 may select an audio track with a lowest decode-able audio bitrate for streaming. In one example, two audio tracks with different bitrates and/or audio formats may be available by encoding the single source media using different codecs. For example, the two audio tracks may include an audio track with AAC format, at a bitrate of 128 kbps and an audio track with AC-3 (Dolby Digital) format, at a bitrate of 384 kbps. When selecting the low audio bitrate, the selector module 306 may switch between different audio codecs for encoding low and high quality audio representations. To avoid a non-seamless audio codec switch, a decoder may be reset during the streaming discontinuity. For example, a forced streaming discontinuity may be required by an audio codec switch. The streaming discontinuity, such as already occurred, may be utilized to switch between audio codecs to avoid the forced streaming discontinuity. Output from the selector module 306 is a selected audio bitrate (speed) to stream future data chunks. For example, for streaming audio in AAC format, a bitrate of approximately 128 kbps may be used for streaming future segment (chunk).

Figure 4:
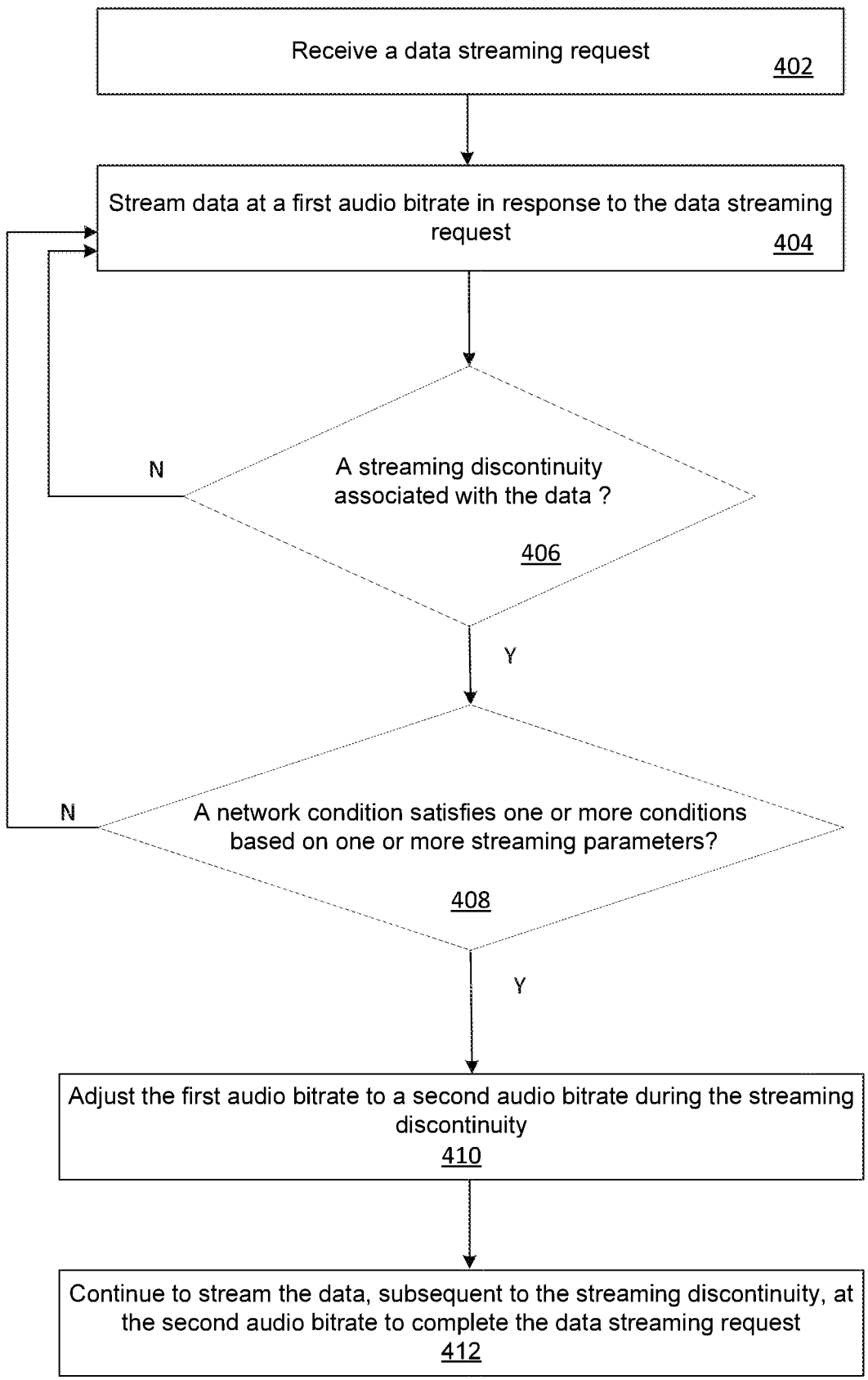
FIG. 4 illustrates a process diagram of adaptive audio bitrate selection, according to some embodiments.

FIG. 4 is a flowchart for a method 400 for adaptive audio bitrate selection, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1-3. For example, method 400 may represent the operation of an audio bitrate selection system (e.g., audio bitrate selection system 300 of FIG. 3) However, method 400 is not limited to that example embodiment.

In step 402, a media device receives a data streaming request. For example, media device 106 may receive a request to stream a video session from a user.

In step 404, the media device streams data at a first audio bitrate in response to the data streaming request. For example, media device 106 may stream data with AC-3 (Dolby Digital) format, at a bitrate of 384 kbps.

In step 406, the media device determines whether there is a streaming discontinuity associated with the data. The streaming discontinuity may include an event of a rebuffer (e.g., empty buffer), an event of a streaming session paused by a user, and/or an event of an interruption on the data. The event of an interruption on the data may include an advertisement break.

If no streaming discontinuity is determined, the method 400 goes to 404.

If a streaming discontinuity is determined, the method 400 goes to 408.

In step 408, the media device determines, in response to the determination that there is a streaming discontinuity, whether a network condition satisfies one or more conditions based on one or more streaming parameters. In some examples, the network condition may be associated with previously downloaded information. In some examples, the one or more streaming parameters include a measured network bandwidth available for video downloads, a network bandwidth, a selected bitrate for video or audio, available bitrates for video or audio, an audio or video bandwidth, or an audio or video buffer level.

In some aspects, the one or more conditions may include a first condition that a measured network bandwidth available for video downloads is lower or equal to a lowest available bitrate for a video chunk. In some examples, the measured network bandwidth available for video downloads may not include an audio bandwidth that audio occupies. The measured network bandwidth available for video downloads may increase when the audio bandwidth is decreased. The first condition may indicate that the network is not able to support any available video bitrate without using the buffer.

In some aspects, the one or more conditions may include a second condition that a most recently selected video chunk bitrate is equal to a lowest available bitrate for a video chunk. For example, the lowest available bitrate for a video chunk may be selected from the available video bitrates, using the adaptive streaming technology. The second condition may indicate that the streaming discontinuity, such as rebuffer, was not avoided by selecting a lower video bitrate.

In some aspects, the one or more conditions may include a third condition that an addition of the measured network bandwidth available for video downloads and a difference between a highest available bitrate for audio and a lowest available bitrate for audio is greater than or equal to the most recently selected video chunk bitrate. The third condition may indicate that streaming experience may be improved by adaptive audio bitrate selection.

In some aspects, the one or more conditions may include a fourth condition that a current audio bandwidth is greater than a current video bandwidth.

In some aspects, the one or more conditions may include a fifth condition that a network bandwidth is below a threshold. The threshold may include a predetermined threshold, such as 2 Mbps. Alternatively or in addition, the threshold may be associated with a selected audio or video bitrate, such as half of the selected audio or video bitrate.

In some aspects, the one or more conditions may include a sixth condition that an audio buffer level and/or a video buffer level is below a threshold. In some aspects, the one or more conditions may not be limited to the first, second, third, fourth, fifth and/or the sixth condition, and may include more or less conditions.

In some aspects, the determination of whether a network condition satisfies one or more conditions may be based on whether the network condition satisfies one of the one or more conditions.

In some aspects, the determination of whether a network condition satisfies one or more conditions may be based on whether the network condition satisfies at least a predetermined number of the one or more conditions.

In some aspects, the determination of whether a network condition satisfies one or more conditions may be based on the one or more conditions with one or more weighted ratios. In some examples, the one or more conditions may be modulated using one or more weighted ratios. For example, the first condition may include that a measured network bandwidth available for video downloads is lower or equal to twice of a lowest available bitrate for a video chunk.

If the network condition does not satisfy the one or more conditions based on the determination, the method 400 goes to 404.

If the network condition satisfies the one or more conditions based on the determination, the method 400 goes to 410.

In step 410, the media device adjusts the first audio bitrate to a second audio bitrate during the streaming discontinuity. In some aspects, the second audio bitrate is different from the first audio bitrate. For example, the second audio bitrate is lower than the first audio bitrate. In some aspects, the media device may select, based on the audio bitrate selection system 300 (e.g., FIG. 3), an audio track at the second bitrate. For example, the media device may select an audio track with AAC format, at a bitrate of 128 kbps. In some examples, the media device may select the lowest decodeable audio bitrate or quality from the available audio bitrates. When adjusting to the second audio bitrate, the media device may switch between different audio codecs for encoding low and high quality audio representations. A decoder may be reset during the streaming discontinuity. For example, a forced streaming discontinuity may be required by an audio codec switch. The streaming discontinuity may be utilized to switch between audio codecs to avoid the forced streaming discontinuity.

In step 412, the media device continues to stream the data, subsequent to the streaming discontinuity, at the second audio bitrate to complete the data streaming request.

In some examples, subsequent to continuing to stream the data at the second audio bitrate, the media device may determine whether there is a subsequent streaming discontinuity associated with the data. The media device may determine, in response to the determination that there is a subsequent streaming discontinuity, whether the network condition satisfies the one or more conditions based on the one or more streaming parameters. The media device may, in response to the determination that the network condition does not satisfy the one or more conditions, adjust the second audio bitrate to the first audio bitrate during the subsequent streaming discontinuity. In some examples, the media device may select the highest audio bitrate or quality from the available audio bitrates. For example, the media device may select an audio track with AC-3 (Dolby Digital) format, at a bitrate of 384 kbps. When adjusting to the first audio bitrate, the media device may switch between different audio codecs for encoding low and high quality audio representations. A decoder may be reset during the subsequent streaming discontinuity, to avoid a non-seamless audio codec switch. For example, a forced streaming discontinuity may be required by an audio codec switch. The subsequent streaming discontinuity, such as already occurred, may be utilized to switch between audio codecs to avoid the forced streaming discontinuity. In some examples, the media device may continue to stream the data, subsequent to the subsequent streaming discontinuity, at the first audio bitrate to complete the data streaming request.

Example Computer System

Figure 5:
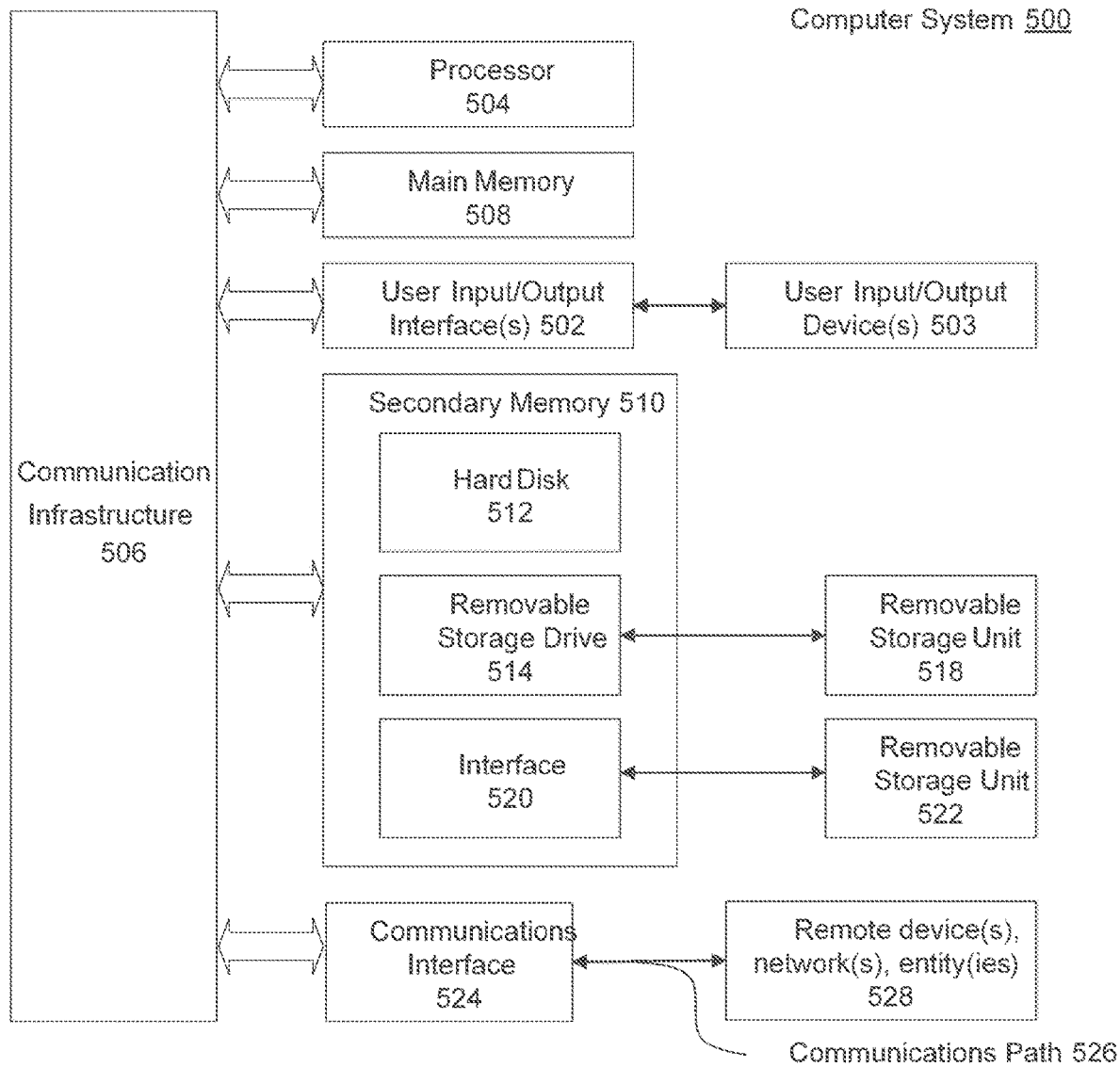
FIG. 5 illustrates an example computer system useful for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, the audio bitrate selection system 300 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving, by a media device, a data streaming request;
streaming data comprising video data at a first video bitrate and audio data at a first audio bitrate in response to the data streaming request;
first determining there is a streaming discontinuity associated with the data;
second determining, in response to the first determination that there is the streaming discontinuity, that a measured network bandwidth available for video downloads is lower or equal to a lowest available video bitrate, that a selected bitrate for the video data is equal to the lowest available video bitrate, and that the measured network bandwidth plus a difference between a highest available audio bitrate for the audio data and a lowest available audio bitrate for the audio data is greater than or equal to the selected bitrate for the video data;
in response to the second determination, adjusting the first audio bitrate to a second audio bitrate during the streaming discontinuity, wherein the second audio bitrate is different from the first audio bitrate; and
continuing to stream the data, subsequent to the streaming discontinuity, at the second audio bitrate to complete the data streaming request.

2. The computer-implemented method of claim 1, wherein the streaming discontinuity comprises an event of a rebuffer, an event of a streaming session paused by a user, or an event of an interruption on the data.

3. The computer-implemented method of claim 1, wherein the selected bitrate is associated with previously downloaded information.

4. The computer-implemented method of claim 1, wherein the adjusting the first audio bitrate to the second audio bitrate during the streaming discontinuity comprises: selecting an audio stream at the second bitrate.

5. The computer-implemented method of claim 1, further comprising:
subsequent to the continuing to stream the data at the second audio bitrate, third determining whether there is a subsequent streaming discontinuity associated with the data;
fourth determining, in response to the third determination that there is a subsequent streaming discontinuity, that the measured network bandwidth available for video downloads is lower or equal to the lowest available video bitrate, that the selected bitrate for the video data is equal to the lowest available video bitrate, and that the measured network bandwidth plus the difference between the highest available audio bitrate for the audio data and the lowest available audio bitrate for the audio data is greater than or equal to the selected bitrate for the video data;
in response to the fourth determination, adjusting the second audio bitrate to the first audio bitrate during the subsequent streaming discontinuity; and
continuing to stream the data, subsequent to the subsequent streaming discontinuity, at the first audio bitrate to complete the data streaming request.

6. The computer-implemented method of claim 1, further comprising:
selecting the second audio bitrate based on an adaptive audio bitrate selection process.

7. A computing system for performing adaptive audio bitrate selection, comprising:
one or more memories; and
at least one processor each coupled to at least one of the memories and configured to perform operations comprising:
receiving a data streaming request;
streaming data comprising video data at a first video bitrate and audio data at a first audio bitrate in response to the data streaming request;
first determining there is a streaming discontinuity associated with the data;
second determining, in response to the first determination that there is the streaming discontinuity, that a measured network bandwidth available for video downloads is lower or equal to a lowest available video bitrate, that a selected bitrate for the video data is equal to the lowest available video bitrate, and that the measured network bandwidth plus a difference between a highest available audio bitrate for the audio data and a lowest available audio bitrate for the audio data is greater than or equal to the selected bitrate for the video data;
in response to the second determination, adjusting the first audio bitrate to a second audio bitrate during the streaming discontinuity, wherein the second audio bitrate is different from the first audio bitrate; and
continuing to stream the data, subsequent to the streaming discontinuity, at the second audio bitrate to complete the data streaming request.

8. The computing system of claim 7, wherein the streaming discontinuity comprises an event of a rebuffer, an event of a streaming session paused by a user, or an event of an interruption on the data.

9. The computing system of claim 7, wherein the selected bitrate is associated with previously downloaded information.

10. The computing system of claim 7, wherein the operation of the adjusting the first audio bitrate to the second audio bitrate during the streaming discontinuity comprises: selecting an audio stream at the second bitrate.

11. The computing system of claim 7, the operations further comprising:
subsequent to the continuing to stream the data at the second audio bitrate, third determining whether there is a subsequent streaming discontinuity associated with the data;
fourth determining, in response to the third determination that there is a subsequent streaming discontinuity, that the measured network bandwidth available for video downloads is lower or equal to the lowest available video bitrate, that the selected bitrate for the video data is equal to the lowest available video bitrate, and that the measured network bandwidth plus the difference between the highest available audio bitrate for the audio data and the lowest available audio bitrate for the audio data is greater than or equal to the selected bitrate for the video data;
in response to the fourth determination, adjusting the second audio bitrate to the first audio bitrate during the subsequent streaming discontinuity; and
continuing to stream the data, subsequent to the subsequent streaming discontinuity, at the first audio bitrate to complete the data streaming request.

12. The computing system of claim 7, wherein the operations further comprise:
selecting the second audio bitrate based on an adaptive audio bitrate selection process.

13. A non-transitory computer-readable medium having instructions stored thereon that, when executed by at least one computing device, cause the at least one computing device to perform operations comprising:
receiving a data streaming request;
streaming data comprising video data at a first video bitrate and audio data at a first audio bitrate in response to the data streaming request;
first determining there is a streaming discontinuity associated with the data;
second determining, in response to the first determination that there is the streaming discontinuity, that a measured network bandwidth available for video downloads is lower or equal to a lowest available video bitrate, that a selected bitrate for the video data is equal to the lowest available video bitrate, and that the measured network bandwidth plus a difference between a highest available audio bitrate for the audio data and a lowest available audio bitrate for the audio data is greater than or equal to the selected bitrate for the video data;
in response to the second determination, adjusting the first audio bitrate to a second audio bitrate during the streaming discontinuity, wherein the second audio bitrate is different from the first audio bitrate; and
continuing to stream the data, subsequent to the streaming discontinuity, at the second audio bitrate to complete the data streaming request.

14. The non-transitory computer-readable medium of claim 13, wherein the streaming discontinuity comprises an event of a rebuffer, an event of a streaming session paused by a user, or an event of an interruption on the data.

15. The non-transitory computer-readable medium of claim 13, wherein the selected bitrate is associated with previously downloaded information.

16. The non-transitory computer-readable medium of claim 13, wherein the operation of the adjusting the first audio bitrate to the second audio bitrate during the streaming discontinuity comprises: selecting an audio stream at the second bitrate.

17. The non-transitory computer-readable medium of claim 13, wherein the operations further comprise:
   selecting the second audio bitrate based on an adaptive audio bitrate selection process.

* * * * *